Patented Dec. 12, 1950

2,534,108

UNITED STATES PATENT OFFICE 2,534,108

PROCESS FOR COPOLYMERIZING MONOMERS HAVING DIFFERENT POLYMERIZATION RATES

Willem Leendert Johannes de Nie and Rudolf Herman Mettivier Meyer, Amsterdam, Netherlands, assignors to Shell Development Company, San Francisco, Calif., a corporation of Delaware No Drawing. Application July 22, 1947, Serial No. 762,810. In the Netherlands March 23, 1944

Section 1, Public Law 690, August 8, 1946
Patent expires March 23, 1964

9 Claims. (Cl. 260—78.5)

This invention relates to a process for copolymerizing two or more substances in an emulsion. More specifically, the invention relates to copolymerizations between one substance which is readily polymerizable by itself and another substance which either does not form high molecular weight polymers at all or which forms high molecular weight polymers only at high temperatures after long periods of time.

If such a mixture of polymerizable substances is subjected to polymerizing conditions in the usual manner, the time for polymerization is very long so that it is necessary to employ high temperatures to initiate the polymerization. The use of such a high reaction temperature is undesirable in that it results in the formation of polymers having a relatively low average molecular weight. Further, polymers so produced have poor form-stability at room temperature and inferior mechanical properties so that such polymers do not have extensive utilization.

The substances which are difficult to polymerize, as hereinafter defined, frequently have induction periods which are so long that it is often assumed that they are incapable of forming high molecular weight polymers. For instance, isobutylene is very difficult to polymerize unless it is used in a relatively small proportion with some substance such as butadiene which is relatively easy to polymerize. The process of the present invention makes it possible to polymerize substances which are ordinarily difficult or impossible to polymerize.

It is an object of the present invention to provide a process for the ready polymerization of substances which are difficult to polymerize, with substances which are relatively easy to polymerize. It is a further object of this invention to cause the polymerization of such substances at low temperatures and with relatively short polymerization periods. Another object of this invention is to provide a polymerization process which yields copolymerization products having good mechanical properties and which have high stability.

In general, the objects of the present invention are accomplished by emulsifying a substance which is relatively easy to polymerize and heating it to a polymerization temperature until the induction period for the monomer is substantially complete. When the induction period for the first substance is substantially complete a substance which is difficult to polymerize is added to the emulsion and the polymerization is completed. Examples of the substances which are difficult to polymerize are isobutylene, ethylene, vinyl ethers such as divinylether, maleic acid anhydride and fumaric acid esters such as ethyl fumarate. As examples of the substances which are relatively easy to polymerize may be mentioned vinylidene chloride, vinylidene fluoride, vinylidene bromide, and vinylidene iodide; vinyl halides such as vinyl chloride, vinylfluoride, vinyl bromide, and vinyl iodide; and vinyl esters such as vinyl acetate and ester of acrylic and methacrylic acids, such as ethyl acrylate and methyl methacrylate and acrylonitrile and methacrylonitrile.

It has been found that if one attempts to polymerize a mixture containing at least one compound which is difficult to polymerize and one compound which is easy to polymerize, that the induction period for the polymerization will be extremely long or that polymerization will not take place at all. However, when only the readily polymerizable compound is first subjected to polymerizing conditions, and the less readily polymerizable compound is later added, the total time for polymerization will ordinarily be much shorter than the time necessary for polymerizing the mixture if both compounds are mixed and subjected to polymerizing conditions simultaneously.

Although reference is frequently made throughout the specification to the polymerization of two components, one of which is more readily polymerizable than the other, it should be understood that the present invention is not limited to the copolymerization of a two component mixture. Thus one may select as a readily polymerizable component a mixture of two or more substances which are readily polymerized and after these substances have passed through the induction period, one or more less readily polymerizable substances may be added and the polymerization completed.

The shortening of the induction period is particularly noticeable in those cases in which the readily polymerizable compound has an extremely short induction period when polymerized alone. Vinylidene chloride is an example of such a substance. When vinylidene chloride is polymerized with isobutylene in the form of an aqueous emulsion the induction period is ordinarily over 24 hours. However, if the vinylidene chloride is subjected to polymerizing conditions and the isobutylene is not added until polymerization commences, the total time for polymerizing the mixture will be only slightly longer than the time necessary for polymerizing the vinylidene chloride by itself.

According to the process of the present invention, it is possible to prepare copolymers of high average molecular weight which contain a relatively small number of polarized atoms or radicals as compared with polymers produced in the past. High molecular weight compounds have been produced in the past only when the starting materials contained a high percentage of highly polar atoms or radicals. The polymers produced from acrylic acid esters, vinyl chloride and vinyl acetate are examples of highly polar compounds which yield high molecular weight polymers. In some applications of plastics the presence of highly polarized groups is undesirable and efforts have been made to prepare polymers of less polar compounds. The present invention enables one to prepare copolymers having a lower percentage of polar groups than was heretofore thought possible. This is considered important because the less polar polymers have been found to be more stable and are thus capable of holding their shape at relatively high temperatures. In addition, the polymers prepared in accordance with the present invention have better electrical properties and are more readily soluble in the usual polymer solvents. Another advantage of the present invention is that the copolymers so produced may be fabricated with only a small amount of plasticizer being used.

The following non-limiting example illustrates the process of the present invention:

*Example*

A. A mixture containing 30 grams of sodium cetyl sulfate, 1157 grams of distilled water, and 10 grams of 30% hydrogen peroxide was introduced into an autoclave of stainless steel. The pH of the solution was reduced to 5 by the addition of three grams of four normal sulfuric acid. The specific gravity of the water phase was 1.006. To this solution was added 300 grams of distilled vinylidene chloride and the temperature was maintained at 45° C. After approximately one hour polymerization started and after approximately two hours a decrease in pressure in the vessel was noticeable. The polymer so produced was coagulated, washed and dried and was found to contain 72% by weight chlorine.

B. To an aqueous solution such as that described above was added 255 grams of vinylidene chloride and 45 grams of isobutylene. The temperature was maintained at 45° C. for a period of 15 hours and polymerization had not started at the end of this time.

C. To an aqueous phase as described in "A" above, 255 grams of vinylidene chloride was added and maintained at a temperature of 45° C. for about one hour, whereupon 45 grams of isobutylene was introduced. Polymerization started approximately three hours after the addition of the vinylidene chloride and a decrease of pressure was perceptible after four hours. The polymer was coagulated, washed, and dried and contained 63% by weight chlorine.

We claim as our invention:

1. A process for copolymerizing two polymerizable ethylenically unsaturated organic monomeric compounds, one of said compounds being able to be polymerized in a relatively short period at 45° C. in the presence of a polymerization catalyst, and the other compound being able to be polymerized only after a long period of exposure to the same temperature and catalyst, which comprises emulsifying the more readily polymerizable compound in water containing an emulsifying agent and a polymerization catalyst, heating the said emulsion at 45° C. until the induction period of the said compound is complete, adding at one time the total quantity of the less readily polymerizable compound and completing the polymerization under the same reaction conditions.

2. In a process for producing emulsion copolymers of at least two polymerizable ethylenically unsaturated organic monomeric compounds, at least one of said compounds being able to be polymerized in a relatively short period at 45° C. in the presence of a polymerization catalyst, and the remaining compounds being able to be polymerized only after a long period of exposure to the same temperature and catalyst, the improvement comprising emulsifying the more readily polymerizable compound in water containing an emulsifying agent and a polymerization catalyst, heating the emulsion until the induction period of the said compound is substantially complete, adding the less readily polymerizable compound and completing the polymerization.

3. A process for copolymerizating with a dissimilar ethylenically unsaturated monomer of the group consisting of vinylidene halides, vinyl halides, vinyl esters of saturated monocarboxylic acids, acrylic acid esters and methacrylic acid esters of saturated monohydric alcohols, and mixtures thereof, comprising emulsifying the said dissimilar ethylenically unsaturated monomer in water containing an emulsifying agent and a polymerization catalyst, heating the emulsion at a temperature of 45° C. until the induction period of that monomer is complete, adding at one time the total quantity of isobutylene and completing the polymerization under the same reaction conditions.

4. A process for copolymerizing isobutylene with a dissimilar ethylenically unsaturated monomer of the group consisting of vinylidene halides, vinyl halides, vinyl esters of saturated monocarboxylic acids, acrylic acid esters and methacrylic acid esters of saturated monohydric alcohols, and mixtures thereof, comprising emulsifying the said dissimilar ethylenically unsaturated monomer in water containing an emulsifying agent and a polymerization catalyst, heating the emulsion until the induction period of the monomer is substantially complete, adding at one time the total quantity of isobutylene and completing the polymerization.

5. A process for copolymerizing ethylene with an ethylenically unsaturated monomer of the group consisting of the vinlidene halides, vinyl halides, vinyl esters of saturated monocarboxylic acids, acrylic acid esters and methacrylic acid esters of saturated monohydric alcohols, and mixtures thereof, comprising emulsifying the said ethylenically unsaturated monomer in water containing an emulsifying agent and a polymerization catalyst, heating the emulsion until the induction period of the monomer is substantially complete, adding at one time the total quantity of the ethylene and completing the polymerization.

6. A process for copolymerizing a maleic acid ester with an ethylenically unsaturated monomer of the group consisting of the vinylidene halides, vinyl halides, vinyl esters of saturated monocarboxylic acids, acrylic acid esters and methacrylic acid esters of saturated monohydric alcohols, and mixtures thereof, comprising emulsifying the said ethylenically unsaturated monomer in water containing an emulsifying agent and a polymerization catalyst, heating the emulsion until the induction period of the monomer is substantially complete, adding at one time the total quantity of the maelic acid ester and completing the polymerization.

7. The process of copolymerizing vinylidene chloride and isobutylene comprising emulsifying vinylidene chloride in water containing an emulsifying agent and a polymerization catalyst, maintaining said emulsion at a temperature of 45° C. for one hour and then adding isobutylene to the emulsion and completing polymerization.

8. A process for copolymerizing vinylidene chloride and isobutylene comprising emulsifying 255 parts by weight of vinylidene chloride in water containing an emulsifying agent and a polymerization catalyst, heating the emulsion to a temperature of 45° C. for one hour, adding 45 parts by weight of isobutylene to the said emulsion and completing the polymerization under the same conditions as employed before the addition of the isobutylene.

9. A process for copolymerizing vinylidene chloride and isobutylene comprising emulsifying vinylidene chloride in water containing an emulsifying agent and a polymerization catalyst, heating said emulsion at a low temperature until the induction period of the vinylidene chloride is complete, adding isobutylene to the emulsion and completing the polymerization under the same conditions as employed before the addition of the isobutylene.

WILLEM LEENDERT JOHANNES DE NIE.
RUDOLF HERMAN METTIVIER MEYER.

REFERENCES CITED

The following references are of record in the file of this patent:

UNITED STATES PATENTS

| Number | Name | Date |
|---|---|---|
| 2,397,260 | Hanford | Mar. 26, 1946 |
| 2,409,679 | Hanford | Oct. 22, 1946 |

FOREIGN PATENTS

| Number | Country | Date |
|---|---|---|
| 745,424 | Germany | Dec. 2, 1943 |